United States Patent [19]
Shipley

[11] Patent Number: 5,573,069
[45] Date of Patent: Nov. 12, 1996

[54] APPARATUS FOR A ROTO-SHEARING TILLER

[76] Inventor: John Shipley, 1200 N. Wenas Rd., Selah, Wash. 98942

[21] Appl. No.: 342,758

[22] Filed: Nov. 21, 1994

[51] Int. Cl.$^6$ ............................................. A01B 33/02
[52] U.S. Cl. ............................................ 172/42; 172/112
[58] Field of Search .................. 56/504, 505; 172/42, 172/119, 121, 532, 604, 763, 64, 72, 112, 116

[56] References Cited

U.S. PATENT DOCUMENTS

| | | | |
|---|---|---|---|
| 1,635,612 | 7/1927 | Dick et al. . | |
| 1,684,861 | 9/1928 | Dirschauer . | |
| 1,912,706 | 6/1933 | Goodman | 172/119 X |
| 2,679,200 | 5/1954 | Johnson et al. | 172/119 X |
| 2,943,687 | 7/1960 | Merry et al. . | |
| 3,139,049 | 6/1964 | Brown | 172/42 X |
| 3,362,482 | 1/1968 | Riddle . | |
| 3,658,135 | 4/1972 | Thompson | 172/42 |
| 4,002,205 | 9/1977 | Falk . | |
| 4,062,408 | 12/1977 | Enters et al. . | |
| 4,278,133 | 4/1981 | de Marcellus . | |
| 4,372,397 | 2/1983 | Goertzen et al. . | |
| 5,048,616 | 9/1991 | Hoff . | |

Primary Examiner—Terry Lee Melius
Assistant Examiner—Robert Pezzuto
Attorney, Agent, or Firm—Stratton Ballew

[57] ABSTRACT

An apparatus for pulverizing hard surfaces, the apparatus having multiple sets of elongated, curvilinear shearing blades. The shearing blades are helically mounted about a rotational shaft, adjacent sets of shearing blades mounted at an inverse pitch angle. The mounting orientation allows layers of the substance to be pulverized to be sheared off a compacted surface, then rotated about the rotational shaft, while also being move back and forth along the longitudinal axis of the rotational shaft, leading to more complete pulverization. The shearing blades are mounted intermediate their edges to the rotational shaft by support members, and at a rake angle relative to the surface for ensuring efficient operation. The total arc length of the blades is at least 360° and the trailing edges of the blades are turned outward to prevent bucking. The arrangement of the blades also causes the apparatus to pull itself into the surface to be pulverized to ease operation. The blades are removably mounted.

15 Claims, 8 Drawing Sheets

APPARATUS FOR A ROTO-SHEARING TILLER

BACKGROUND OF THE INVENTION

1. Field of the Invention

The invention relates to rotary blade systems for pulverizing hard and compacted surfaces such as in rototilling to prepare ground for planting.

2. Description of the Prior Art

Manual methods, such as a shoveling, are often not sufficient to break up or pulverize compacted and hard surfaces. In addition to requiring extensive time and physical effort, manual methods are rarely capable of fully pulverizing the compacted surface. For this reason, mechanized tools and implements are often used to pulverize or break up compacted or hard surfaces.

There are many existing examples of mechanical tillers and the like. For example, U.S. Pat. No. 2,943,687 to Merry et al. for a Reversible Earth Working Tiller; U.S. Pat. No. 4,062,408 to Enters et al. for a Rotary Tiller Tine Assembly; U.S. Pat. No. 4,002,205 to Falk for a Horticultural Device; U.S. Pat. No. 3,658,135 to Thompson for a Rotary Tiller With Backup Plate Furrowing Means; U.S. Pat. No. 3,362,482 to Riddle for a Rotor For Ground Working Equipment; U.S. Pat. No. 1,635,612 to Dick et al. for an Agricultural Machine; U.S. Pat. No. 1,684,861 to Dirschauer for an Agricultural Machine; U.S. Pat. No. 5,048,616 to Hoff for a Garden Tiller Tine Assembly; U.S. Pat. No. 4,372,397 to Goertzen et al. for a Garden Tiller With Extended Tine Shield; and U.S. Pat. No. 4,278,133 to de Marcellus for Attachments For Lawn Edgers all show mechanized tools for earth working. While all these tools employ a rotary action, they all consist of cutting blades that primarily lie in a vertical plane relative to the surface to be worked, some additionally having flanges extending from the distal end of the cutting blades substantially parallel to the axis of rotation.

The orientation of these blades gives rise to two problems. First, when the vertically oriented rotating blades strike the compacted surface the apparatus is forced upward, away from the surface to be worked. It requires a great deal of effort, strength and control to overcome this force and to keep the cutting blades in contact with the compacted surface while moving the apparatus forward. Secondly, the generally vertical faces of the cutting blades cause the substance to be essentially shoveled quickly to the rear of the apparatus. This does not permit the surface to be fully pulverized; rather, it tends to create large chunks of still-compacted material.

The gardening hobbyist creates special requirements for such mechanized tillers. The industrial work place assumes the operator will possess sufficient strength to wrestle with equipment as required to achieve the desired function. The backyard gardener, however, is often not able to force a heavy piece of equipment as desired, due to a lack of strength or technique. Often soil tilling equipment is rented on a seasonal basis as needed to prepare the soil. The operator spends little time learning how to most effectively operate the equipment and ends up learning by doing—starting up the equipment and beginning the task. This often results in a frustrated operator, and presents a significant safety risk.

The blades of a conventional tiller are difficult to maintain and replace. Tilling blades, or tines, of conventional design impact the soil in succession, resulting in a lurching or bouncing motion, which is hard on the operator and the equipment. Tilling dulls and often bends tilling blades due to the nature of the blades rotational impacting of the soil surface and buried objects often contained in soils, such as rocks, tree roots and clays. The gardening hobbyist is especially discouraged when confronted by a damaged blade. Repairing a blade typically requires skills and tools the gardening hobbyist does not possess, thus requiring either taking the equipment to a repair shop or expensive on-site repair.

In light of the above, a need exists for an apparatus for breaking up hard surfaces, as found in soil tilling, which is superior to conventional means in that it pulls into the surface to be tilled as it rotates rather than requiring the operator or machinery to push the rotating tilling mechanism down and into the surface, allowing for complete pulverization of the material.

A further need exists for a rotary blade system employed in a tiller which is maintained and replaced in a simple manner.

SUMMARY OF INVENTION

The invention provides an apparatus for loosening and pulverizing compacted or hard surfaces without intensive labor or excessive costs. The apparatus is provided with elongated, curvilinear shearing blades, for shearing through the compacted surface. The shearing blades are helically mounted about and axially spaced from a rotational shaft. The blades are provided with a beveled leading edge having a substantially constant radius of curvature, and a trailing edge with a decreasing radius of curvature. The decreasing radius of curvature prevents the trailing edge from catching on the compacted surface which helps ensure smooth, relatively effortless operation of the apparatus. The curvilinear blades mounted about the axis of rotation cause the apparatus to be drawn into the surface as each blade rotates through the surface. Helically mounting the blades such that adjacent blade sets have an inverse pitch angle permits the pulverized substance to be moved not only about the rotational axis, but also outwardly and inwardly, along the longitudinal axis of the shaft, so that the substance is fully churned, and less resistance to motion is encountered when operating the apparatus. This also ensures that the pulverized substance will be deposited back into the channels from which it was sheared. The blades are mounted, intermediate their edges, to the rotating shaft by support members. Intermediate mounting provides for more efficient and more effective operation of the apparatus, by ensuring that less resistance is met by the apparatus in operation. Even more significantly, intermediate mounting provides for more efficient operation by ensuring that the substance is churned, and fully pulverized, rather than simply being pushed to the side. Additionally, the blades are mounted to provide a rake angle, relative to the hard surface, again providing for more efficient operation. Preferably, the blades are mounted in groups, symmetrically located about the shaft to provide smooth operation. It is also preferred to mount a group on either side of the center of the rotational shaft. While this will result in a small center strip of the surface not being pulverized, it will allow a much larger area to be worked in a single pass. The groups are generally mounted as mirror images of one another about the center point of the rotational shaft. This ensures that the apparatus will not attempt to veer off to one side or the other. The blades are removably mounted to the rotational shaft for easy replacement and repair. The rotational drive shaft may be adapted to be driven by an internal or an external rotating drive means.

This invention is particularly suitable for use in the agricultural industry. Most soils require tilling or cultivating as preparation for planting. Tilling is a difficult task even when soil conditions are optimal for the turning and preparation of fallow ground. Tilling becomes especially strenuous when the soil is dry and compacted or choked with weeds and stubble from prior plantings. The shape and orientation of the shearing blades tend to pull the apparatus into the surface to be worked, lessening the effort required to operate the apparatus and more thoroughly perform the job.

Other applications also require the breaking up of hard surfaces in significant quantities. A variety of compact surfaces can benefit from the ability of this rotary blade system to process these surfaces into pulverized material, loosened chunks and pieces in a manner that is effective and efficient in terms of time and funds. Examples include: mining, digging, dredging, road construction, leveling applications and fertilizer pulverizing.

BEST MODE FOR PRACTICING THE INVENTION

Figure 1:
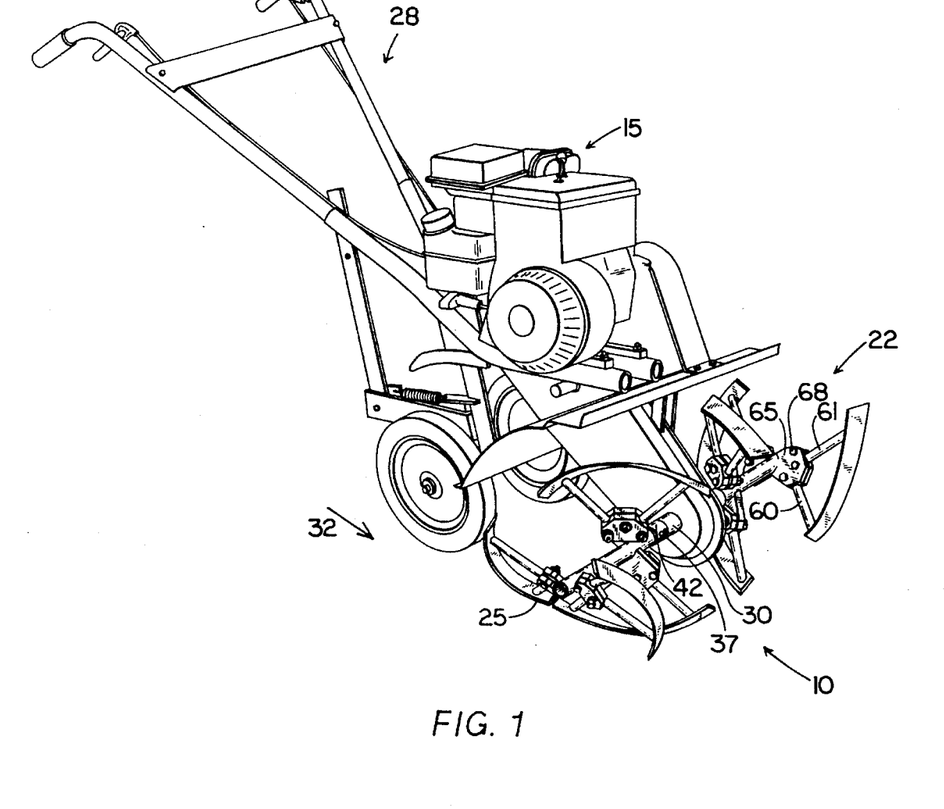
FIG. 1 is an isometric view of the preferred embodiment of the pulverizing apparatus mounted on a front end tiller.
Figure 2:
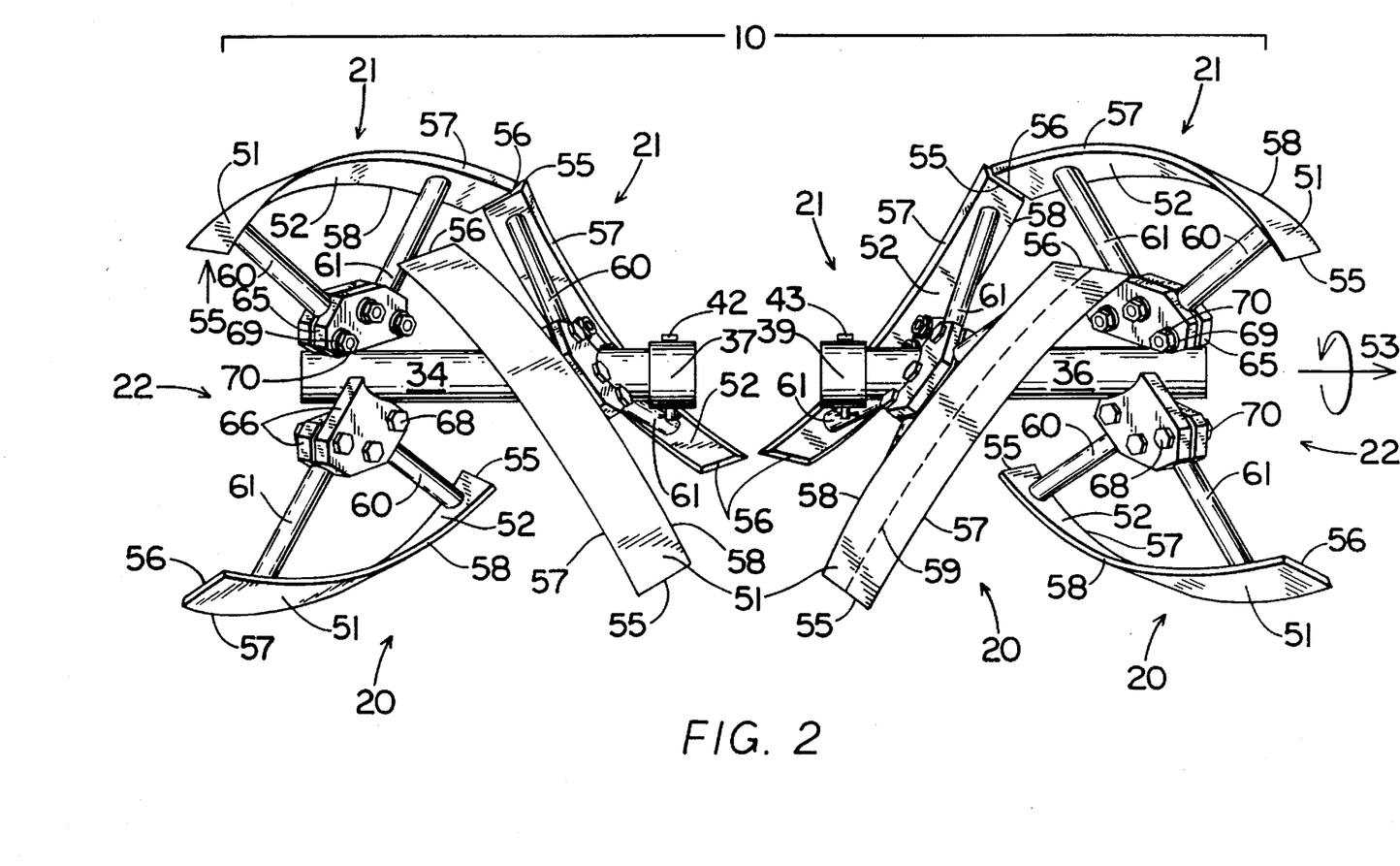
FIG. 2 is a front elevation view of the pulverizing apparatus.
Figure 3:
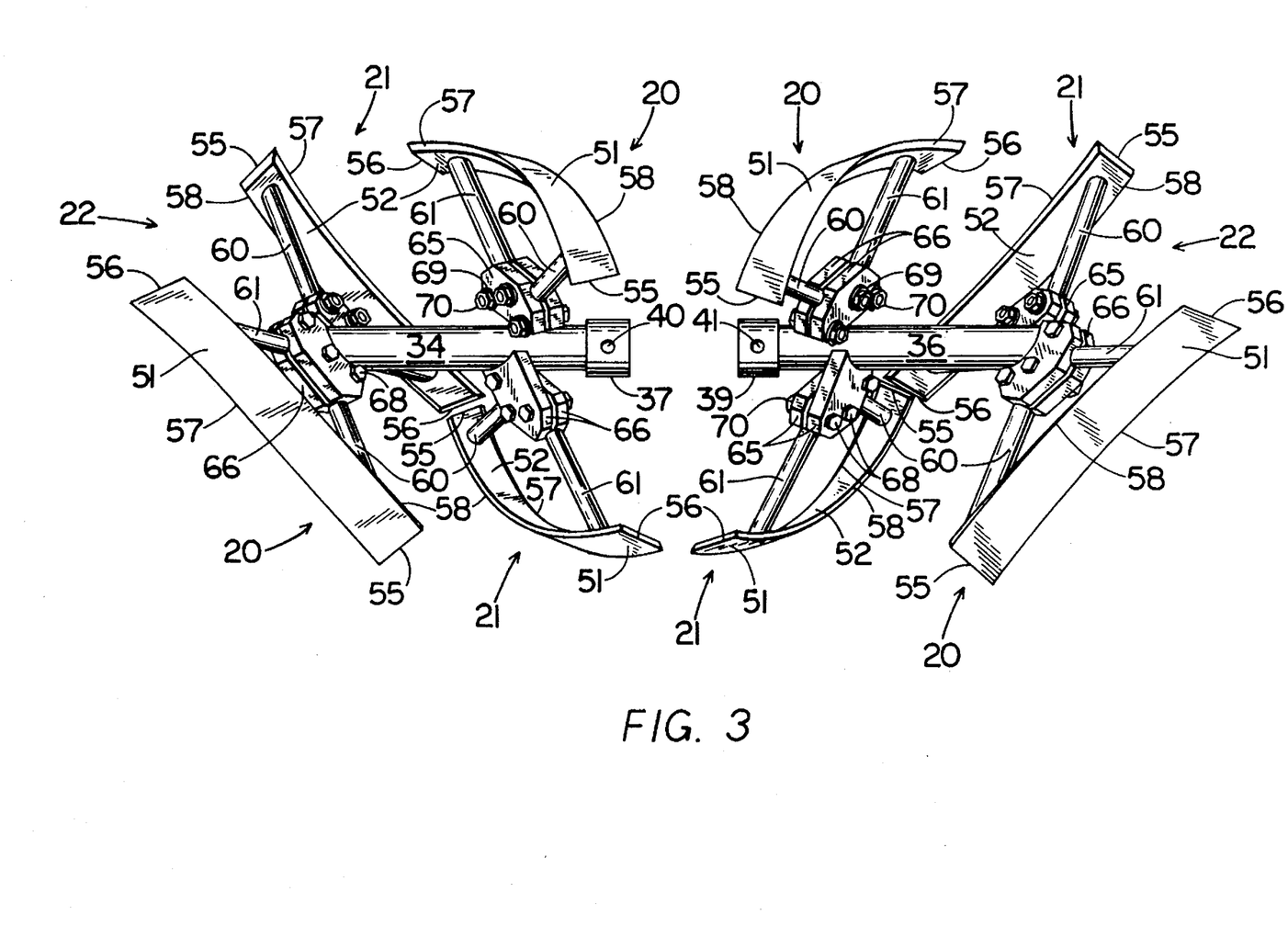
FIG. 3 is a bottom plan view of the pulverizing apparatus.
Figure 4:
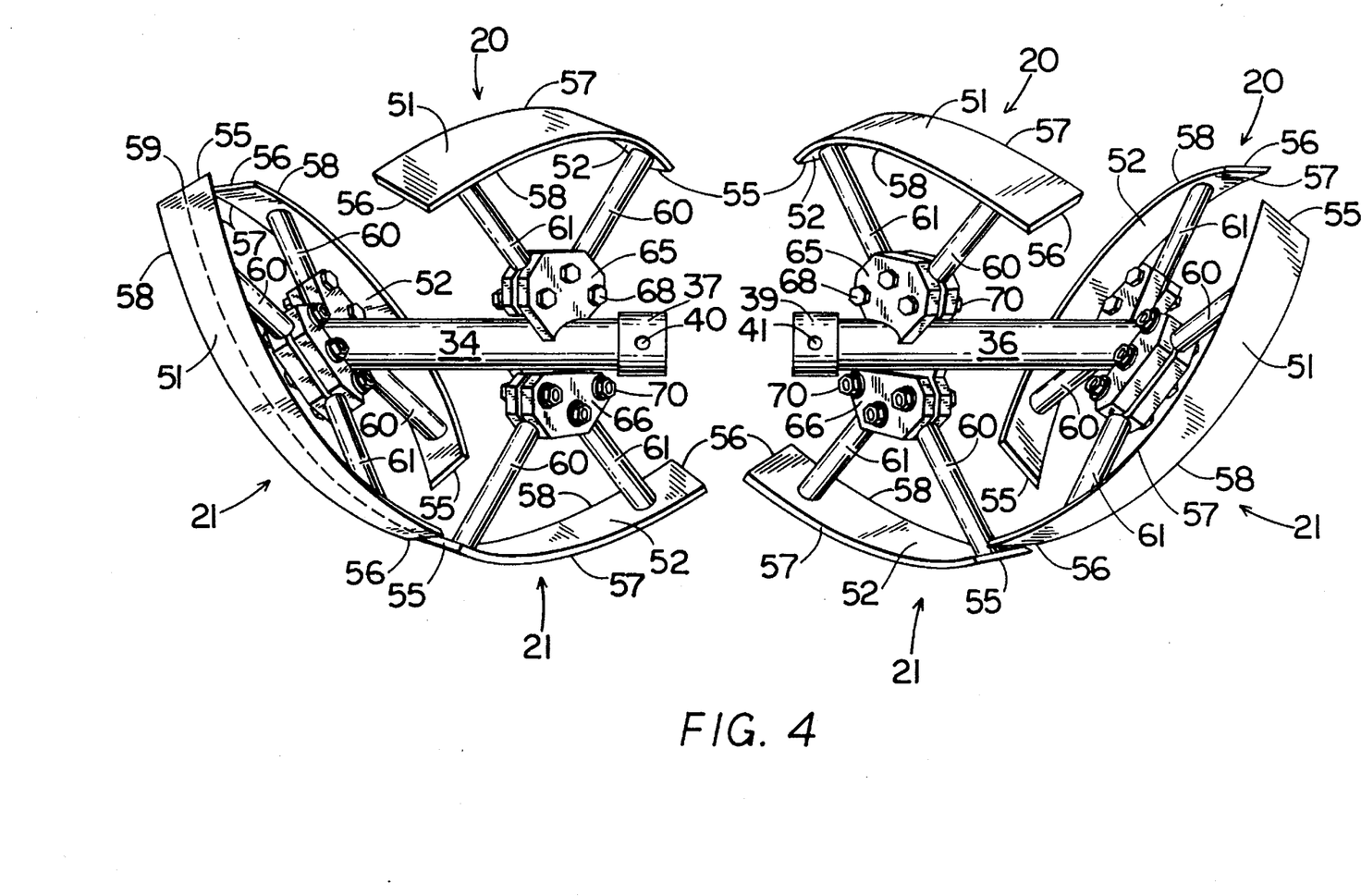
FIG. 4 is a top plan view of the pulverizing apparatus.
Figure 5:
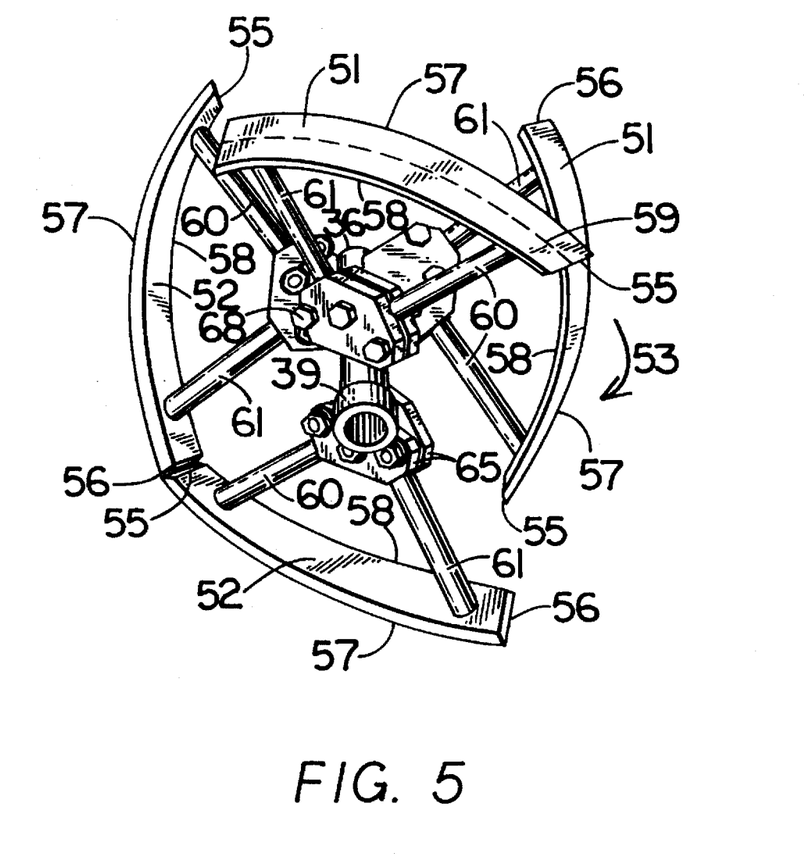
FIG. 5 is an isometric end elevation view of the rotary blade system.

With reference to FIG. 1, the subject of the present invention is a field maintainable hard surface pulverizing apparatus 28 for use with a rotating drive means 15 for breaking up hard surfaces, such as pulverizing compacted soil. The apparatus 10 is composed of a system of rotary shearing blades 20, 21 mounted on a rotational shaft 25, the shearing blades 20, 21 being shaped and oriented so as to pull the apparatus 10 into the surface to be pulverized, or tilled, as it rotates. This alleviates the need to have the operator or the weight of the machinery push the apparatus 10 down and into the surface. The apparatus 10 is designed to shear the compacted layer, and direct the substance not only about the rotational shaft 25, but also inwardly and outwardly with respect to the longitudinal axis of that shaft 25. The rotary shearing blade system 20, 21 effectively churns the material to achieve more complete pulverization and to reduce the resistance met by operation of the apparatus 10. The apparatus 10 will be described in one preferred form, as a front end tiller type apparatus 28 for pulverizing areas of compacted soil. Other forms and uses will be apparent to those skilled in the art.

FIG. 1 shows a preferred embodiment of the apparatus 10 with an associated rotary drive means 15. The hard surface pulverizing apparatus 10 is attached to a front end tiller 28. Alternatively, a rear end tiller (not shown), or a tractor pulled tiller apparatus (also not shown), may be employed to provide supporting structure and a rotary drive means 15 to the pulverizing apparatus 10. The rotary drive means 15 carried on front end tiller 28 includes a rotary drive shaft 30. The rotary drive shaft 30 is mounted on the front end tiller 28 for rotational movement about the rotary drive shaft's 30 longitudinal axis. The rotary drive shaft 30 is mounted such that its longitudinal axis is substantially parallel to the surface to be pulverized and perpendicular to the direction of travel 32 of the front end tiller 28.

As shown in FIGS. 2, 3, 4, and 5 the apparatus 10 includes a rotational shaft 25. In the preferred embodiment, the rotational shaft 25 is composed of two halves 34, 36. The rotational shaft 34, 36 may be formed of 1 inch diameter tubular steel, each half 34, 36 preferably being 10 inches long. Each half 34, 36 has a mounting collar 37, 39 on its inside terminus to receive a respective portion of the rotary drive shaft 30. The mounting collars 37, 39 may be formed of tubular steel having an inside diameter equal to the outside diameter of the rotational shaft 34, 36. In the preferred embodiment, the mounting collars 37, 39 are 1¼ inches long. Each of the mounting collars 37, 39 and the respective portions of the rotary drive shaft 30 have a set of collinear holes 40, 41 therein for receiving a locking pin 42, 43, whereby each half of the rotational shaft 34, 36 may be mounted to the a respective end of the rotary drive shaft 30 for rotation therewith. This provides a quick and simple method for mounting the pulverizing apparatus 10 to the rotary drive means 15.

The pulverizing apparatus 10 comprises at least two shearing blades 20, 21, although eight shearing blades 20, 21 are preferred. The shearing blades 20, 21 are grouped into sets 22.

Each shearing blade 20, 21 has a first surface 51 and a second surface 52 opposed to the first surface 51. The shearing blades 20, 21 may be formed from a rectangular steel plate, preferably being ¼ inch thick and 11.14 inches long. The shearing blades 20, 21 have a first end 55 and a second end 56, the first end 55 being the portion of the shearing blade 20, 21 to first contact the surface when the apparatus 10 is being operated, clockwise 53 with reference to FIG. 5. The shearing blades 20, 21 have a leading edge 57 and a trailing edge 58. In the preferred embodiment, the leading edge 57 is beveled using a mill, a grinder, or a press. Also in the preferred embodiment, the first end 55 and the second end 56 are not parallel to one another. The first and second ends 55, 56 formed by cutting the steel plate so as to form an angle of preferably 20° between each of the respective ends 55, 56 and the leading edge 57, making the leading edge 57 the longest edge on the shearing blade 20, 21.

A longitudinal axis 59 is defined between the leading edge 57 and trailing edge 58 extending from the first end 55 to the second end 56. The shearing blades 20, 21 are curvilinear, being curved along their longitudinal axis 59. The first surface 51 is convex and the second surface 52 is concave. The radius of curvature along the leading edge 57 is substantially constant, such that when the shearing blade 20, 21 is axially mounted to the rotational shaft 34, 36, all points on the leading edge 57 will sequentially contact the surface to be pulverized as the shearing blade 20, 21 rotates relative to that surface. The trailing edge 58 has a radius of curvature that decreases from the first end 55 to the second end 56. The diminishing radius of curvature of the trailing edge 58 allows the shearing blade 20, 21 to rotate while the trailing edge 58 is kept free of the surface permitting smoother, more efficient operation of the pulverizing apparatus 10. The curvature of the shearing blades 20, 21 is obtained by roll forming each shearing blade 20, 21, preferably to a radius of 8.5 inches. The shearing blades 20, 21 are formed by feeding them into a roller at an angle, preferably +35 and −35 degrees from the longitudinal axis, to obtain left handed shearing blades 20 and right handed shearing blades 21 respectively. When roll forming the shearing blades 20, 21 the leading edge 57 is kept to the inside of the radius.

The shearing blades 20, 21 are helically mounted about the rotational shaft 34, 36. Each blade 20, 21 is spaced from the rotational shaft 34, 36, the leading edge 57 concentric about the longitudinal axis of the rotational shaft 34, 36. The trailing edge 58 is substantially a volutiform wrapped about the rotational shaft 34, 36, the diminishing radius of curvature resulting in a slight eccentricity in the trailing edge toward the second end 56 of the shearing blade 20, 21. The eccentricity is sufficient to ensure that the trailing edge 58 at the second end 56 will not make contact with the compacted surface as the shearing blade 20, 21 passes through that surface. At no point does the shearing blade 20, 21 become perpendicular to the rotational shaft 25.

Shearing blades 20, 21 are mounted in sets 22 about the rotational shaft. A set is comprised of at least two shearing blades 20, 21 which substantially lie in the same plane. In the preferred embodiment there are four sets 22 with at least two shearing blades 20, 21 per set 22.

Figure 6:
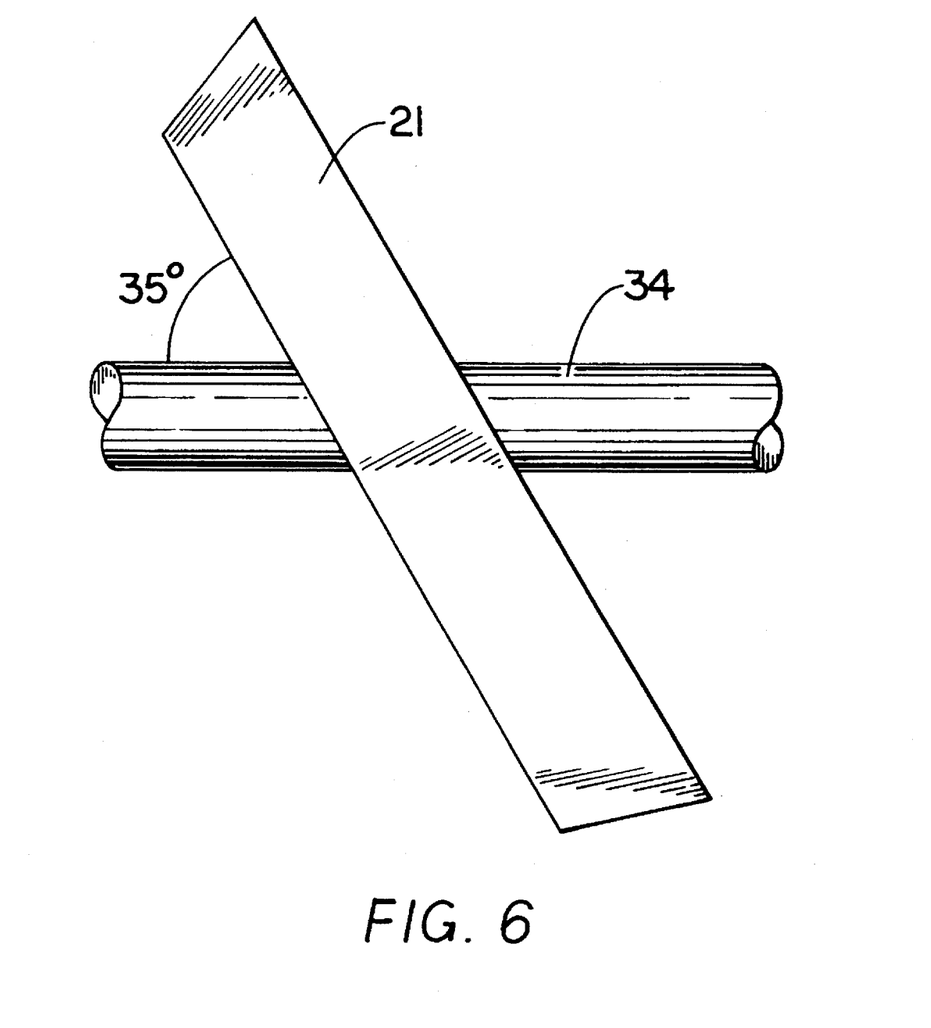
FIG. 6 is a detail view of rotary blade pitch angle.

With reference to FIG. 6, adjacent sets of shearing blades 22 are mounted at an inverse pitch angle relative to one another. The pitch angle of the shearing blades 20, 21 is preferably between 20 and 70 degrees relative to a plane defined perpendicular to the longitudinal axis of the rotational shaft 25. 35° is the preferred angle. Alternating the pitch angle of adjacent sets 22 causes the soil to be churned about, and moved inwardly and outwardly along, the longitudinal axis of the rotational shaft 34.

In a preferred embodiment of the invention, the hard surface pulverizing apparatus 10 comprises multiple sets 22 of shearing blades 20, 21. The combined arc lengths of all of the shearing blades 20, 21 must sum to substantially 360° or greater. This requirement is satisfied as long as some portion of a shearing blade 20, 21 mounted on its respective half of the rotating shaft 34, 36 is in contact with the work surface, such that the apparatus 10 is supported. In the preferred embodiment, the combined arc length of the shearing blades 20, 21 on each half of the rotational shaft 34, 36 sums to substantially 360°.

The shearing blades 20, 21 are symmetrically disposed about the rotational shaft 25. Adjacent sets 22 of shearing blades 20, 21 are offset by 360° divided by the total number of shearing blades 20, 21 per half of the rotational shaft 34, 36 from one another about the longitudinal axis of the rotational shaft 25. In the preferred embodiment, each half of the rotational shaft 34, 36 has two sets 22 of two shearing blades 20, 21 each. The sets 22 of shearing blades 20, 21 on each half 34, 36 are mounted such that the first set 22 of shearing blades 20, 21 is rotated 90 degrees about the longitudinal axis of the rotational shaft 25 relative to the adjacent set 22 of shearing blades 20, 21. Had each set 22 contained three shearing blades 20, 21, adjacent sets 22 would be mounted rotated 60° about the longitudinal axis relative to the adjacent set 22 of shearing blades 20, 21.

Figure 7:
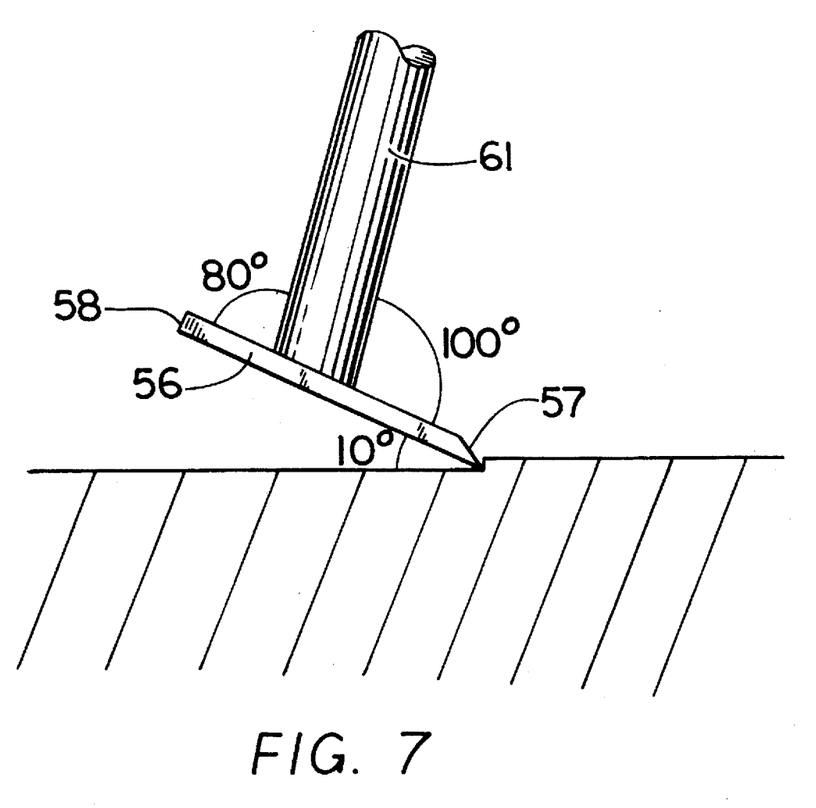
FIG. 7 is a detail view of rotary blade rake angle.

In the preferred embodiment adjacent sets 22 of shearing blades 20, 21 are helically mounted about the rotational shaft 34 at an inverse pitch angle from one another. Both pitch angles are equal in magnitude, but have an opposite orientation along the longitudinal axis of the rotational shaft 34, 36. Additionally, with reference to FIG. 7, the shearing blades 20, 21 are oriented at a rake angle of between 0° and 45° relative to a surface to be tilled, 10° being preferred.

Figure 8:
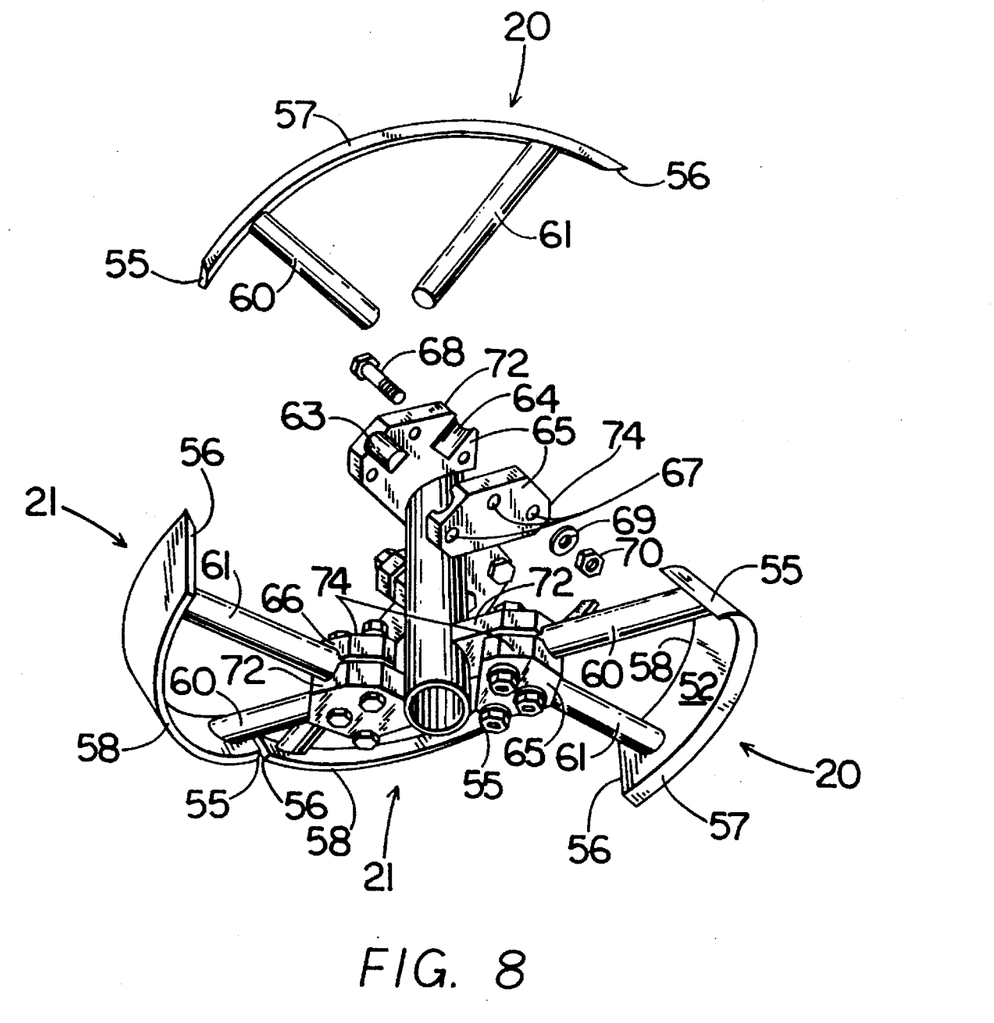
FIG. 8 is an exploded isometric end elevation view of the rotary blade system.

FIG. 8 illustrates the shearing blades 20, 21 being radially attached to the rotational shaft 25 by support members 60, 61 implemented as spokes 60, 61. The support members 60, 61 in the preferred embodiment are ⅝ inch roundbar steel, of 4½ and 4¾ inches in length respectively. Other conventional, rigid structural members may be used as support members 60, 61. A first support member 60, has a first end fixed to the second surface 52 of a shearing blade 20, 21, intermediate the leading edge 57 and trailing edge 58, in the vicinity of, but spaced from the first end 55 of that shearing blade 20, 21. A second support member 61, has a first end fixed to the second surface of a shearing blade 20, 21, intermediate the leading edge 57 and trailing edge 58, in the vicinity of, but spaced from the second end 56 of that shearing blade 20, 21. If the support members 60, 61 are spaced too far from their respective ends they will not provide sufficient rigidity to the shearing blade 20, 21. The support members 60, 61 are mounted to the shearing blade 20, 21 such that a right angle is defined between the support members 60, 61.

As shown in FIG. 8, there are four mounting shoes 65, 66 in the preferred embodiment. Each mounting shoe 65, 66 is composed of two halves 72, 74. Each mounting shoe half 72, 74 may be formed from a ½×2½×2½ inch steel plate. Each of the mounting shoe halves 72, 74 have a set of three bolt holes 67 therethrough for receiving three bolts 68 respectively, washers 69 and nuts 70 being provided on the ends of the bolts 68 for securing the mounting shoe halves 72, 74 together. A pair of cavities 63, 64, oriented at an angle of 90° to each other may be formed by drilling along the plane where the two mounting shoe halves 72, 74 are joined. The bolt holes 67 are located such that their longitudinal axes are substantially perpendicular to the plane where they are joined, the holes 67 separated by the cavities 63, 64 from each other.

One half of the mounting shoe 72 will be relieved of material to allow it to be received on the rotational shaft 34 at an angle of 35° out of the plane perpendicular to the longitudinal axis of the rotational shaft 34. In a preferred embodiment, two halves 72, 74 of the mounting shoes 65 will fit at a positive 35° angle, while the other two halves 72, 74 of the mounting shoe 66 will fit at a negative 35° angle. One half 72 of each mounting shoe 65, 66 is fixed to the rotational shaft 34.

Material is also relieved from the mounting shoes 65, 66 to ensure that leading edge 57 of the shearing blades 20, 21 is concentric about the rotational shaft 34 at a distance equal to the radius of curvature of the leading edge 57. The half of the mounting shoe 74 not attached to the rotational shaft 34 is relieved of material to avoid having that shoe 74 interfere with the rotational shaft 34 when it is bolted to the attached half 72.

The second ends of the support members 60, 61 are received in the pair of cavities 63, 64 defined in the attached half 72 of the mounting shoe 65, 66. The other half 74 of the mounting shoe 65, 66 is then bolted to the attached half 72 using the bolts 68, washers 69 and nuts 70. The orientation of the cavities 63, 64 to one another, at a right angle, helps to retain the support members 60, 61. The mounting shoe 65, 66 allows for easy maintenance and repair of the shearing blades 20, 21. Other conventional means, not shown, may be employed for mounting, such as: screw type mounts, bayonet type mounts, and welding.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible which employ the same inventive concepts as described above. Therefore, the invention is not to be limited except by the claims which follow.

I claim:

1. An apparatus for pulverizing compacted surfaces comprising:

a rotational shaft;

a plurality of support members, each of the support members having a first end and a second end, the second end of each of the support members mounted to the rotational shaft for rotation therewith; and a plurality of elongated, curvilinear shearing blades, each of the elongated, curvilinear shearing blades having a first end and a second end, a leading edge and a trailing edge, a first surface and a second surface, the leading edge having a constant radius of curvature, the trailing edge having a radius of curvature that decreases from the first end of the elongated, curvilinear shearing blade to the second end thereof, each of the elongated, curvilinear shearing blades axially disposed about the rotational shaft, the second surface of each of the elongated, curvilinear shearing blades mounted intermediate of the leading edge and trailing edge thereof to the first end of at least one of the support members.

2. The apparatus of claim 1 wherein each of the elongated, curvilinear shearing blades is helically disposed about the rotational shaft and spaced therefrom by the support members such that the leading edge of each of the elongated, curvilinear shearing blades is substantially concentric with the rotational shaft.

3. The apparatus of claim 2 wherein each of the elongated, curvilinear shearing blades is mounted to the second end of a respective one of the support members such that the elongated, curvilinear blade is oriented at a rake angle with respect to the compacted surface.

4. The apparatus of claim 3 wherein the plurality of elongated, curvilinear shearing blades are grouped into at least a first set and a second set adjacent to the first set, the elongated, curvilinear shearing blades in the first set mounted about the rotational shaft at a first pitch angle which is the inverse of a second pitch angle at which the elongated, curvilinear shearing blades in the second set are mounted about the rotational shaft.

5. The apparatus of claim 4 wherein the second end of each of the support members is mounted intermediate the first end and the second end of a respective one of the elongated, curvilinear shearing blades.

6. The apparatus of claim 3 wherein the leading edge of each of the elongated, curvilinear shearing blades is beveled.

7. The apparatus of claim 4 wherein the first pitch angle is between 10 and 90 degrees and the second pitch angle is between −10 and −90 degrees.

8. The apparatus of claim 3 wherein the rake angle of each of the elongated, curvilinear shearing blades is between 0 and 45 degrees.

9. The apparatus of claim 1 wherein each of the elongated, curvilinear shearing blades are formed from a rectangular steel plate by beveling a first edge of the steel plate, cutting a first end of the steel plate such that the first end and the first edge define an angle of 20 degrees therebetween and cutting a second end of the steel plate such that the second end and the first edge define an angle of 120 degrees therebetween, and then roll forming the steel plate.

10. The apparatus of claim 9 wherein the steel plate is roll formed by feeding the steel plate through a roller at an angle of approximately positive 35 degrees to a longitudinal axis of the steel plate.

11. The apparatus of claim 9 wherein the steel plate is roll formed by feeding the steel plate through a roller at an angle of approximately negative 35 degrees to a longitudinal axis of the steel plate.

12. An apparatus for pulverizing hard surfaces comprising:

a rotational shaft;

a plurality of support members, each of the support members having a first end and a second end, the second end of each of the support members removably mounted to the rotational shaft for rotational movement therewith; and a plurality of elongated, curvilinear shearing blades, each of the elongated, curvilinear shearing blades having a first end and a second end, a leading edge and a trailing edge, a first surface and a second surface, the leading edge having a radius of curvature which is constant, the trailing edge having a radius of curvature that decreases from the first end of the elongated, curvilinear shearing blade to the second end thereof, the second surface of each of the elongated, curvilinear shearing blades fixed intermediate of the first end and the second end thereof to the first end of at least a respective one of the support members such that each of the elongated, curvilinear shearing blades is helically disposed concentrically about and spaced from the rotational shaft.

13. An apparatus for pulverizing a hard surface comprising:

a rotational shaft;

a plurality of elongated curvilinear shearing blades, each of the elongated curvilinear shearing blades having a first end and a second end, a leading edge and a trailing edge, a first surface and a second surface opposed to the first surface, the leading edge of the elongated curvilinear shearing blades having a radius of curvature which is constant; and the trailing edge of the elongated curvilinear shearing blades having a radius of curvature that decreases from the first end of the elongated curvilinear shearing blade to the second end thereof; and means for mounting the elongated curvilinear shearing blades helically about the rotational shaft and spaced radially therefrom, a first set of the elongated curvilinear shearing blades mounted about the rotational shaft at a first pitch angle, a second set of the elongated curvilinear shearing blades mounted about the rotational shaft adjacent the first set of the elongated curvilinear shearing blades at a second pitch angle having a magnitude equal to a magnitude of the first pitch angle and a direction opposite a direction of the first pitch angle.

14. The apparatus of claim 13 wherein each of the elongated curvilinear shearing blades are mounted to the rotational shaft such that when the rotational shaft is parallel to the hard surface, each of the elongated curvilinear shearing blades define a rake angle relative to the hard surface.

15. The apparatus of claim 14 wherein the leading edge of each of the elongated curvilinear shearing blades is beveled.

* * * * *